United States Patent [19]
Davies

[11] Patent Number: 5,953,923
[45] Date of Patent: Sep. 21, 1999

[54] FLUID DISPENSING APPARATUS AND METHOD OF DISPENSING FLUID

[75] Inventor: Andrew Francis Davies, Knoxfield, Australia

[73] Assignee: Javac Pty Ltd, Knoxfield, Australia

[21] Appl. No.: 08/981,126

[22] PCT Filed: May 24, 1996

[86] PCT No.: PCT/AU96/00315

§ 371 Date: Nov. 24, 1997

§ 102(e) Date: Nov. 24, 1997

[87] PCT Pub. No.: WO96/37759

PCT Pub. Date: Nov. 28, 1996

[30] Foreign Application Priority Data

May 24, 1995 [AU] Australia .................... PN3127

[51] Int. Cl.⁶ .................................................. F17C 7/02
[52] U.S. Cl. .................................. 62/50.1; 222/4; 222/58
[58] Field of Search .................. 62/50.1, 292; 222/3, 222/4, 58

[56] References Cited

U.S. PATENT DOCUMENTS

| | | | |
|---|---|---|---|
| 1,513,967 | 11/1924 | Cozad . | |
| 1,616,785 | 2/1927 | Darby . | |
| 1,840,906 | 1/1932 | Larsen . | |
| 2,545,118 | 3/1951 | St. Clair . | |
| 2,754,081 | 7/1956 | Wilamowski . | |
| 5,263,326 | 11/1993 | Block et al. | 62/292 |
| 5,375,634 | 12/1994 | Egger . | |
| 5,511,387 | 4/1996 | Tinsler | 62/292 |

FOREIGN PATENT DOCUMENTS

| | | |
|---|---|---|
| 34419/58 | 7/1958 | Australia . |
| 28047/83 | 9/1964 | Australia . |
| 17084/83 | 2/1984 | Australia . |
| 17085/83 | 2/1984 | Australia . |
| 1170694 | 1/1959 | France . |
| 1225289 | 6/1960 | France . |
| 1348167 | 11/1963 | France . |
| 1417419 | 10/1965 | France . |
| 1566694 | 5/1969 | France . |
| 602229 | 9/1934 | Germany . |
| 685491 | 12/1939 | Germany . |
| 2015737 | 9/1979 | United Kingdom . |

*Primary Examiner*—Ronald Capossela
*Attorney, Agent, or Firm*—Head, Johnson & Kachigian

[57] ABSTRACT

A fluid dispensing apparatus (1) for dispensing a predetermined weight of fluid under substantially constant pressure including: (a) containing means (2) adapted to contain at least the predetermined amount of fluid; (b) an inlet to the containing means for passing fluid into the containing means and an outlet from the containing means for passing fluid from the containing means; (c) weighing means (16) to monitor the weight of the containing means; and (d) dispensing means to cause the predetermined fluid to flow from the containing means through the outlet at a substantially constant pressure, wherein the weight of the containing means is monitored as fluid is dispensed through the outlet until the predetermined weight of fluid has been dispensed.

22 Claims, 3 Drawing Sheets

FLUID DISPENSING APPARATUS AND METHOD OF DISPENSING FLUID

FIELD OF THE INVENTION

The invention relates generally to apparatus for dispensing a predetermined weight of fluid. More particularly, the present invention relates to apparatus for dispensing a predetermined weight of fluid in a relatively short period of time and a method for dispensing a predetermined weight of fluid.

BACKGROUND TO THE INVENTION

In many fields, it is necessary to dispense a predetermined amount of fluid in a short period of time. One such instance is on a production line for machines which require a certain amount of fluid to be added to them as part of the manufacturing process. One example is a production line for refrigerating devices which require an accurately measured amount of fluid refrigerant to be dispensed to the refrigerating device. Such refrigerant is often dispensed at high pressure in order for it to be dispensed in a short period of time. This is required on a production line to permit other manufacturing functions to be completed timely.

Generally, the apparatus presently used to dispense refrigerant is either a pump which dispenses refrigerant from a reservoir to the refrigerating device or, alternatively, a pneumatic ram to force fluid refrigerant into the refrigeration device. It is critical to measure the amount of refrigerant dispensed because a refrigerating device will not function properly if either too much or too little refrigerant is injected into it.

This measurement is currently achieved by a volume or mass flow meter to monitor the rate of dispatch of fluid refrigerant from the high pressure source. However, these flow meters are expensive. A further disadvantage of these flow meters is that they are not always accurate as it is necessary to convert the flow rate into weight to measure the amount of fluid dispensed. As the relationship between volume and weight is temperature dependant, such flow meters must either be calibrated for a standard temperature or must be further fitted with temperature sensors to correct the weight reading. An alternative method used to measure the amount of fluid refrigerant dispensed is to utilise position indicators or stops in conjunction with a ram. This method tends to be less accurate and also suffers from the temperature sensitive nature of the relationship between volume and weight.

In an effort to improve the efficiency and reliability of such fluid dispensing apparatus, investigations have been carried out to develop a fluid dispensing apparatus with a more reliable and/or cheaper and/or simpler means of monitoring the amount of fluid dispensed.

In order to overcome the temperature dependent nature of the means used to measure the amount of fluid dispensed, it was proposed to measure the actual weight of the fluid to be dispensed. However, it was found that the conventional means to dispense fluid, particularly fluid under pressure, were inappropriate for sensitive weight measuring apparatus as they set up significant hammering of fluid, and the inertia of fluid flow and further the average flow rate is too slow for a production line process.

SUMMARY OF THE INVENTION

Accordingly, there is provided a fluid dispensing apparatus for dispensing a predetermined weight of fluid under a substantially constant pressure including:

(a) containing means adapted to contain at least the predetermined amount of fluid;
(b) an inlet to the containing means for passing fluid into the containing means and an outlet from the containing means for passing fluid from the containing means;
(c) weighing means to monitor the weight of the containing means; and
(d) dispensing means to cause the predetermined fluid to flow from the containing means through the outlet at a substantially constant pressure, wherein the weight of the containing means is monitored as fluid is dispensed through the outlet until the predetermined weight of fluid has been dispensed.

Preferably, the containing means includes a containing chamber for fluid and the dispensing means includes a dispensing chamber for receiving a buffer gas, the containing chamber and dispensing chamber being separated by a resiliently deformable membrane. In this arrangement, the weight can be up to 100 kilograms.

In a preferred form of the invention, the combined weight of the containing means and dispensing means when charged with fluid and buffer gas respectively is up to 20 kilograms.

In another preferred embodiment, the inlet and the outlet are a single opening in the containing chamber.

In another preferred embodiment, the weighing means is digital scales. In another embodiment, the weighing means is a strain bridge. The strain bridge typically has an interface with a microprocessor which enables the microprocessor to directly read the strain bridge output.

Preferably, the resiliently deformable membrane is a diaphragm or, alternatively, a bladder. The membrane may be adapted to be deformed sufficiently to substantially reduce the volume of either the containing chamber or dispensing chamber.

Preferably, the containing means is adapted to withstand an internal pressure of at least 20 bar and preferably, 100 bar. If the fluid is a liquid which has been condensed, it is preferred that liquefaction of the fluid is sustained when the fluid is despatched. If the liquid is allowed to vaporise, it can affect the weight and hence the accurate measurement of the fluid dispensed. Accordingly, the containing chamber and the dispensing chamber are normally sustained at a pressure sufficient to maintain liquefaction of the liquid.

Advantageously, the fluid dispensing apparatus further includes a control means to control the flow of fluid from and/or to the containing means. More advantageously, control means is adapted to cause a first portion of the predetermined amount of fluid to flow from the containing means at a first rate and a second portion of the predetermined amount of the fluid to flow from the containing means at a second rate. Preferably, the first rate is higher than the second rate.

In a further preferred form, the control means includes a first valve through which the first portion of fluid passes and a second valve through which the second portion of fluid passes. The control means is operated such that fluid flows through the first or both valves until a specified percentage of the predetermined amount has been dispensed, whereupon the first valve is closed to permit careful control of fluid flow by the second valve until the predetermined amount has been dispensed.

Preferably, the buffer gas is nitrogen.

More preferably, the dispensing chamber is in fluid connection with a larger reservoir of the buffer gas such that substantially the same pressure of buffer gas in the dispensing chamber is maintained regardless of the position of the membrane. Again, this helps maintain liquefaction, if the fluid is a liquid. More preferably, the substantially constant buffer gas is approximately 20 bar or more.

Preferably, the fluid is a refrigerant or a mixture of refrigerants or oils.

According to a second form of the invention, there is provided a method for dispensing a predetermined weight of fluid being a refrigerant or a mixture of refrigerants and/or oils including the steps of:

(a) charging a containing means with fluid through an inlet in the containing means;

(b) dispensing the fluid from the containing means at a substantially constant pressure through an outlet in the containing means;

(c) measuring the amount of fluid flowing from the containing means by monitoring the decrease in weight of the containing means; and (d) stopping the flow of fluid from the containing means once the predetermined amount of fluid has been dispensed.

In a preferred form of the method, the step of dispensing the fluid further includes the steps of:

(a) dispensing a first portion of the fluid at a first rate; and (b) then dispensing a second portion of the fluid at a second rate;

the first rate being higher than the second rate.

Advantageously, the step of measuring the amount of fluid flowing from the containing means includes measuring the weight of the containing means on digital scales. In another form, the step of measuring the weight of the containing means includes using a strain bridge with an interface to a microprocessor which directly reads the strain bridge resistance output. In this way the strain bridge/microprocessor is integrated as the means to weigh the containing means.

In a further preferred form of the method, it further includes the step of maintaining the containing means under sufficient internal pressure to maintain liquefaction of the fluid.

In a further preferred form, the steps of dispensing the fluid and stopping the dispensing of the fluid are controlled by one or more control valves. Preferably, the flow of fluid is controlled by switching the valves on and off synchronously with the response time of the measuring means, for example the digital scales, to allow discrete weight measurements to be accurately carried out. Preferably, this is achieved by switching the valves on and off in rapid succession.

DESCRIPTION OF THE DRAWINGS

In order that the invention may be fully understood there shall now be described by way of non-limiting example only, preferred embodiments of the present invention, the description being with reference to the accompanying illustrative drawings, in which:

Referring to FIG. 1, an apparatus 1 is shown having a dispensing capsule 2. Dispensing capsule 2 is a high pressure cylinder with two chambers 3 and 4 defined by membrane 5. Dispensing capsule 2 is shown in more detail in FIG. 2. Chamber 4 is in fluid communication by tube 6 with reservoir 7 of buffer gas.

Figure 1:
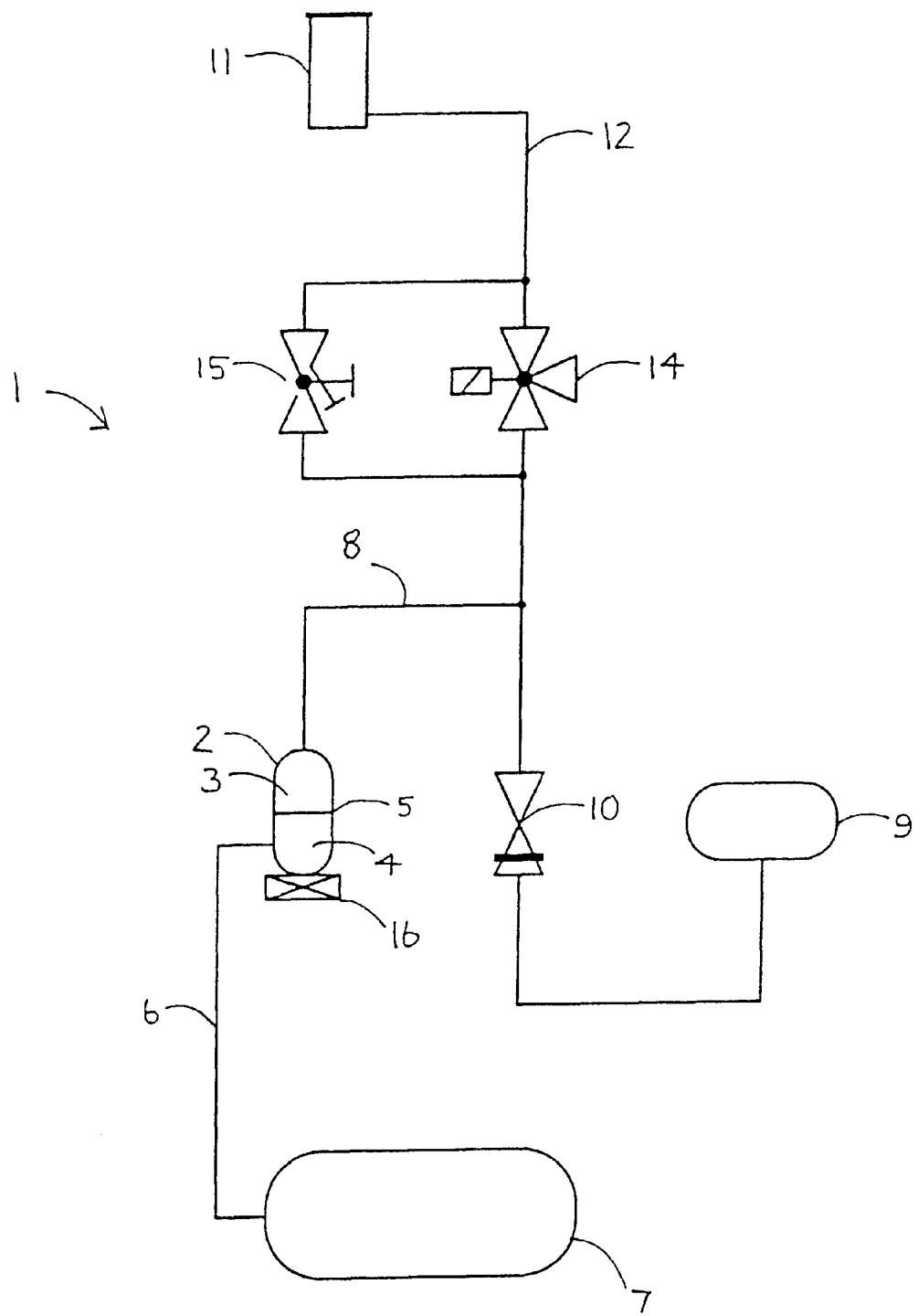
FIG. 1 is a flow chart of one form of the various components in an apparatus for dispensing fluid according to the invention.
Figure 2:
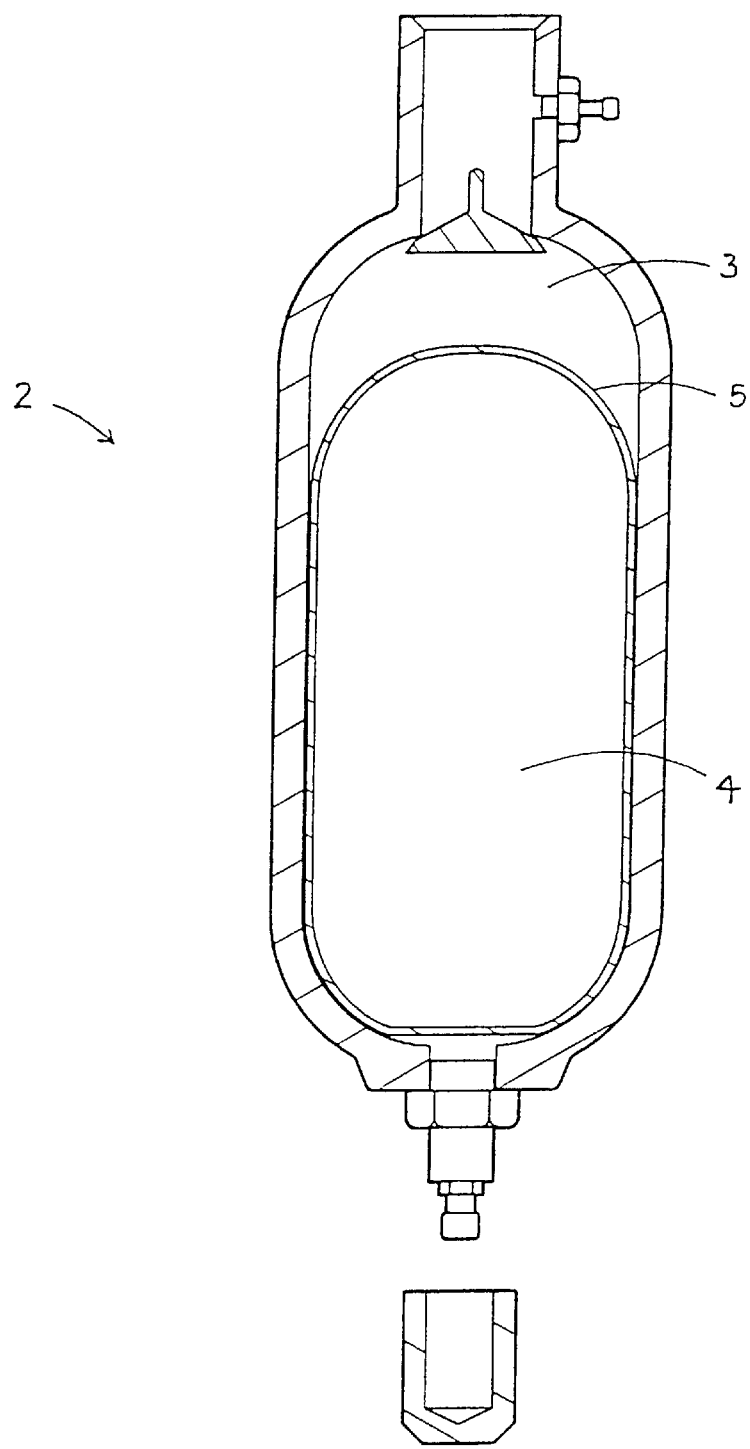
FIG. 2 is a more detailed illustration of the dispensing container of the apparatus illustrated in FIG. 1.

Where such a fluid dispensing apparatus is used to fill refrigerating devices, the fluid in chamber 3 will be a refrigerant such as R134a, CFC, HFC, HCFC, any other refrigerant in compliance with the terms of the Montreal Protocol, oils and others known to those skilled in the art. Further, the fluid may also be isopropane butane or an explosive liquid such as LPG.

After the fluid, such as a refrigerant, has been pumped into chamber 3, the back pressure in the dispensing chamber helps to ensure full liquefaction when a volume is despatched. The open line between chamber 4 and reservoir 7 enables the pressure in the dispensing capsule 2 to be maintained. Dispensing capsule 2 is designed to ensure that there is no contamination of the buffer gas, for example, nitrogen with the fluid. The reduced risk of contamination allows the apparatus to perform a multiple number of shots without losing accuracy.

Generally, the fluid is dispensed under pressure in order to reduce the filling time. At the point where the fluid leaves the fluid dispensing apparatus and enters the receptacle, such as a refrigerating device, there is generally provided a "gun" 11 which may contain heaters and control valves as necessary to control the flow of fluid.

Dispensing capsule 2 rests on scales 16. Scales 16 are digital scales of a type commonly available and capable of +/−1 gram accuracy or better. As discussed above, a strain bridge (not shown) with an interface to a microprocessor (not shown) which directly reads the strain bridge resistance output can also be used to weigh the dispensing capsule 2.

Chamber 3 has fluid communication with tube 8, which has fluid communication with a reservoir 9 of fluid. Chamber 3 also has fluid communication with the final outlet, such as a charging gun 11, via tube 12. Valve 10 controls the flow of fluid into chamber 3 via tube 8, and valve 14 and trickle valve 15 control the flow of fluid out of chamber 3 via tube 12. When valves 14 and 15 are open, they permit the dispensing of up to 50 grams per second of the fluid. In a preferred embodiment, the weight of the nitrogen in chamber 4 is added to the weight of the capsule 2 before dispensing the fluid to ensure that its presence has been considered in calculating the weight of fluid before making the final reading.

Upon actuation, valve 14 opens to permit the fluid to flow from chamber 3, through tube 12, through to gun 11 and then to a refrigerating device (not shown) to receive the fluid. At this time, trickle valve 15 may also be opened so that fluid may also flow through trickle valve 15 simultaneously with valve 14. Once approximately 90% of the predetermined amount of fluid has been dispensed, valve 14 closes so that the remaining 10% is dispensed through trickle valve 15 which more closely controls the flow of fluid. Once the entire predetermined amount of fluid has been dispensed, trickle valve 15 is also closed. The apparatus may then be used to dispense a further predetermined amount of fluid to a further refrigerating apparatus. Alternatively, the dispensing capsule 2 may be recharged by the further injection of fluid into chamber 3, by a pump (not shown) pumping fluid from reservoir 9, through tube 8 and valve 10.

Figure 3:
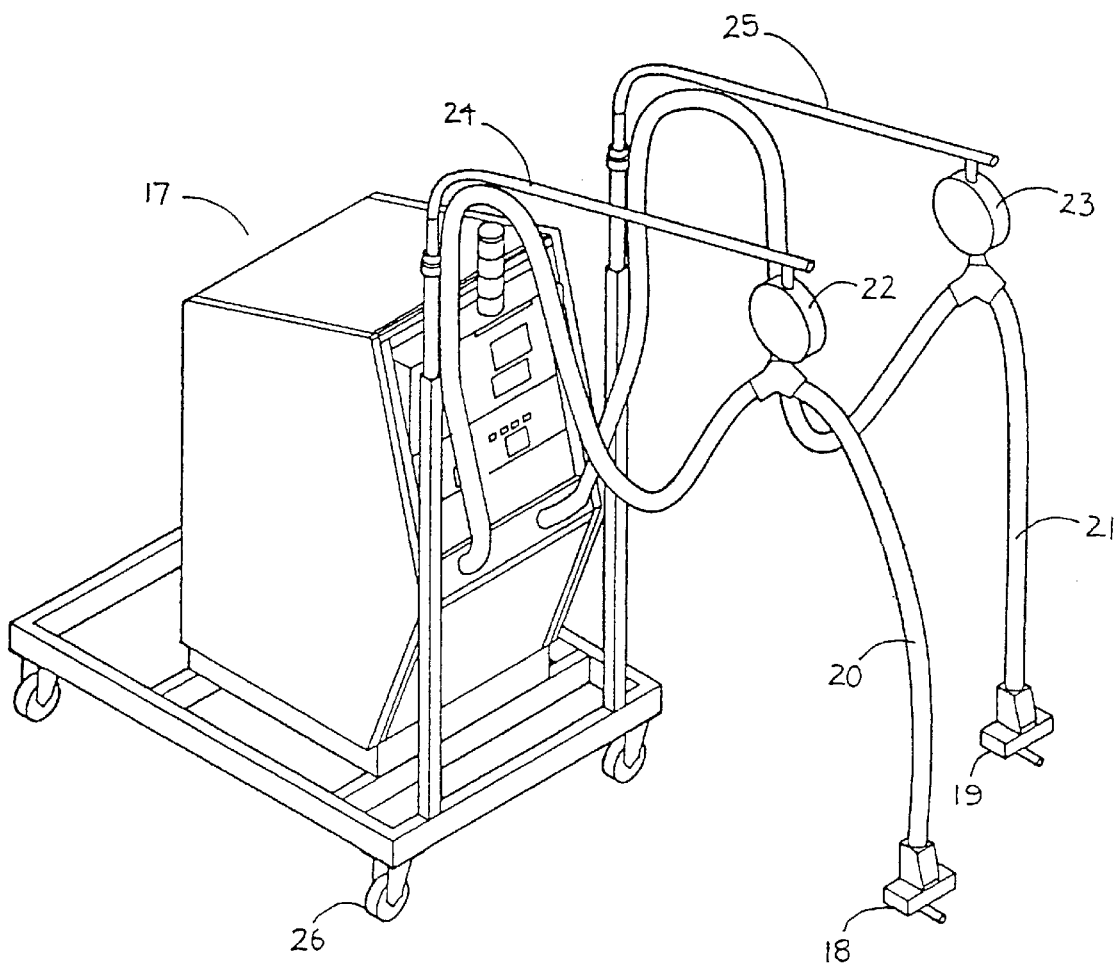
FIG. 3 is a perspective view of apparatus for dispensing fluid.

A perspective view of a fluid dispensing apparatus 17 according to this invention is shown in FIG. 3. In this Figure, two guns are shown as 18 and 19 and outlet tubes are shown as hoses 20 and 21. Guns 18 and 19 can be operated manually or pneumatically. Hoses 20 and 21 are typically made of metal braded teflon which resist expansion under, for example, 20 bars and are hung from attachments 22 and 23 in an upward position to prevent oil from being drawn into the machine during evacuation. Attachments 22 and 23 are in turn attached to apparatus 17 by arms 24 and 25. For convenience, apparatus 17 is easily transportable by movement on casters 26.

As described above, the apparatus shown in FIG. 4 has two guns 18 and 19. In one form of the invention, gun 18 and hose 20 are equivalent to gun 11 and tube 12 of FIG. 1 and are used to dispense, for example, refrigerant. The second gun can be used for a number of different purposes, for example, it may be used to assist in evacuation of, for example, the refrigerating device (not shown) or it may be used to add oil to the compressor (not shown).

In addition, the apparatus shown in FIG. 3 may contain two dispensing capsules with the second gun attached (ultimately) to the second capsule to enable dispensing, for example, of two different refrigerants from the same apparatus. Further, two such fluid dispensing apparatus may be combined to permit the mixing of two fluids before they are dispensed. This may be done by having separate dispensing capsules on separate digital scales or strain bridges and monitoring the amounts of each fluid dispensed. Alternatively, more than one dispensing capsule could be located on the one set of scales or the same strain bridge and the dispensing capsules could be sequentially discharged with the appropriate predetermined amount for each fluid.

A fluid dispensing system such as the one described above may be controlled by a microprocessor. The microprocessor controls the opening and closing of the various valves as well as the operation of pumps and also monitors the weight measured by the digital scales. Information may be provided to the microprocessor via a bar code reader or manually. The bar codes may be located on the containers of the relevant fluid to be dispensed or on the article into which the fluid is to be dispensed. In this way, information concerning the amount and relevant characteristics of refrigerant to be dispensed can be quickly and accurately provided for the operation of the fluid dispensing apparatus. If two compatible refrigerants are to be mixed, for example, the microprocessor can control the appropriate dispensing of the fluids from each of the dispensing capsules.

In addition, a fluid dispensing apparatus such as the one described above could be combined with apparatus known in the art for draining the receptacle, such as a refrigerating device, of any fluid already in the receptacle and testing it for leaks. The leak test involves placing the receptacle for fluid under a vacuum and monitoring any pressure change. The draining and leak check stages would be carried out before dispensing fluid. In FIG. 3, one of the two guns 18 or 19 could be used to recover fluid, such as refrigerant.

The draining stage and the leak checking stage may also be controlled by the same microprocessor. Such multifunction machines assist in the recycling of fluid where possible. Also, when the draining and leak checking stages are being carried out, the dispensing capsule may be recharged. This reduces the time of refrigerating devices on that part of a production line, which improves efficiency of assembly/manufacture.

Appropriate materials to construct the dispensing capsule 2, diaphragm 5 and tubes will be known to those skilled in the art. In particular, diaphragm 5 may be constructed from nitrile or hydrolysed natural butyl rubber (known as HNBR). Most importantly the membrane material must be compatible with the fluid to be dispensed as can be assessed by one skilled in the art. The valves necessary to control the flow of fluid are well known to those skilled in the art. Any relatively inert gas will suffice as the buffer gas, including for example, dry nitrogen.

It will be apparent from the preceding description that a fluid dispensing apparatus and a method for dispensing fluid as described above should more easily and accurately measure the amount of fluid dispensed.

It is to be understood by those skilled in the technology that many variations or modifications in details of design or construction may be made without departing from the essence of the present invention. Therefore, the invention should be understood to include all such variations and modifications within its scope.

I claim:

1. A fluid dispensing apparatus for dispensing a predetermined weight of fluid under substantially constant pressure, which apparatus comprises:

(a) a container adapted to contain at least the predetermined fluid;

(b) an inlet to said container for passing fluid into said container and an outlet from said container for passing fluid from said container;

(c) weighing means to monitor the weight of said container; and (d) dispensing means to cause the predetermined fluid to flow from said container through the outlet at a substantially constant pressure, wherein the weight of said container is monitored as fluid is dispensed through the outlet as said fluid dispensed.

2. The fluid dispensing apparatus of claim 1, wherein said container includes a containing chamber for fluid and the dispensing means includes a dispensing chamber for receiving a buffer gas, the containing chamber and dispensing chamber being separated by a resiliently deformable membrane.

3. The fluid dispensing apparatus of claim 2 wherein the combined weight of the containing means and dispensing means when charged with fluid and buffer gas respectively is up to 20 kilograms.

4. The fluid dispensing apparatus of claim 2 wherein the inlet and the outlet are a single opening in the containing chamber.

5. The fluid dispensing apparatus of claim 2, wherein the membrane is adapted to be deformed sufficiently to substantially reduce the volume of either the containing chamber or dispensing chamber.

6. The fluid dispensing apparatus as set forth in claim 2, wherein the resiliently deformable membrane is either a diaphragm or a bladder.

7. The fluid dispensing apparatus of claim 2, wherein the buffer gas is nitrogen.

8. The fluid dispensing apparatus of claim 2, wherein the dispensing chamber is in fluid connection with a larger reservoir of the buffer gas such that substantially the same pressure of buffer gas in the dispensing chamber is maintained regardless of the position of the membrane.

9. The fluid dispensing apparatus of claim 1 wherein the weighing means is digital scales or a strain bridge.

10. The fluid dispensing apparatus of claim 1, wherein said container is adapted to withstand an internal pressure of at least 20 bar.

11. The fluid dispensing apparatus of claim 1, wherein said container is adapted to withstand an internal pressure of at least 100 bar.

12. The fluid dispensing apparatus of claim 1, further including a control means to control the flow of fluid from or to said container.

13. The fluid dispensing apparatus of claim 12, wherein the control means is adapted to cause a first portion of the predetermined amount of fluid to flow from said container at a first rate and a second portion of the predetermined amount of the fluid to flow from said container at a second rate.

14. The fluid dispensing apparatus of claim 13, wherein the first rate is higher than the second rate.

15. The fluid dispensing apparatus of claim 12, wherein, the control means includes a first valve through which the first portion of fluid passes and a second valve through which the second portion of fluid passes.

16. The fluid dispensing apparatus of claim 1, wherein the fluid is a refrigerant or a mixture of refrigerants and/or oils.

17. A method for dispensing a predetermined weight of fluid being a refrigerant or a mixture of refrigerants and/or oils which comprises the steps of:
(a) charging a container with fluid through an inlet in the container;
(b) dispensing the fluid from the container under a substantially constant pressure through an outlet in the container;
(c) measuring the amount of fluid flowing from the container by monitoring the decrease in weight of the container; and
(d) stopping the flow of fluid from the container once the predetermined amount of fluid has been dispensed.

18. The method of claim 17, wherein the step of dispensing the fluid further includes the steps of:
(a) dispensing a first portion of the fluid at a rate; and
(b) then dispensing a second portion of the fluid at a second rate; the first rate being higher than the second rate.

19. The method of claim 17 including the further steps of intermittently stopping the flow of fluid synchronously with the response time of the fluid measuring.

20. The method of claim 17 wherein digital scales or a strain bridge measure the amount of fluid flowing from the container.

21. The method of claim 17 including the step of maintaining the container under sufficient internal pressure to maintain liquefaction of the fluid.

22. The method of claim 17 wherein said fluid is dispensed by a dispensing chamber in said container which receives a buffer gas wherein the fluid is separated from said dispensing chamber by a membrane.

* * * * *